UNITED STATES PATENT OFFICE.

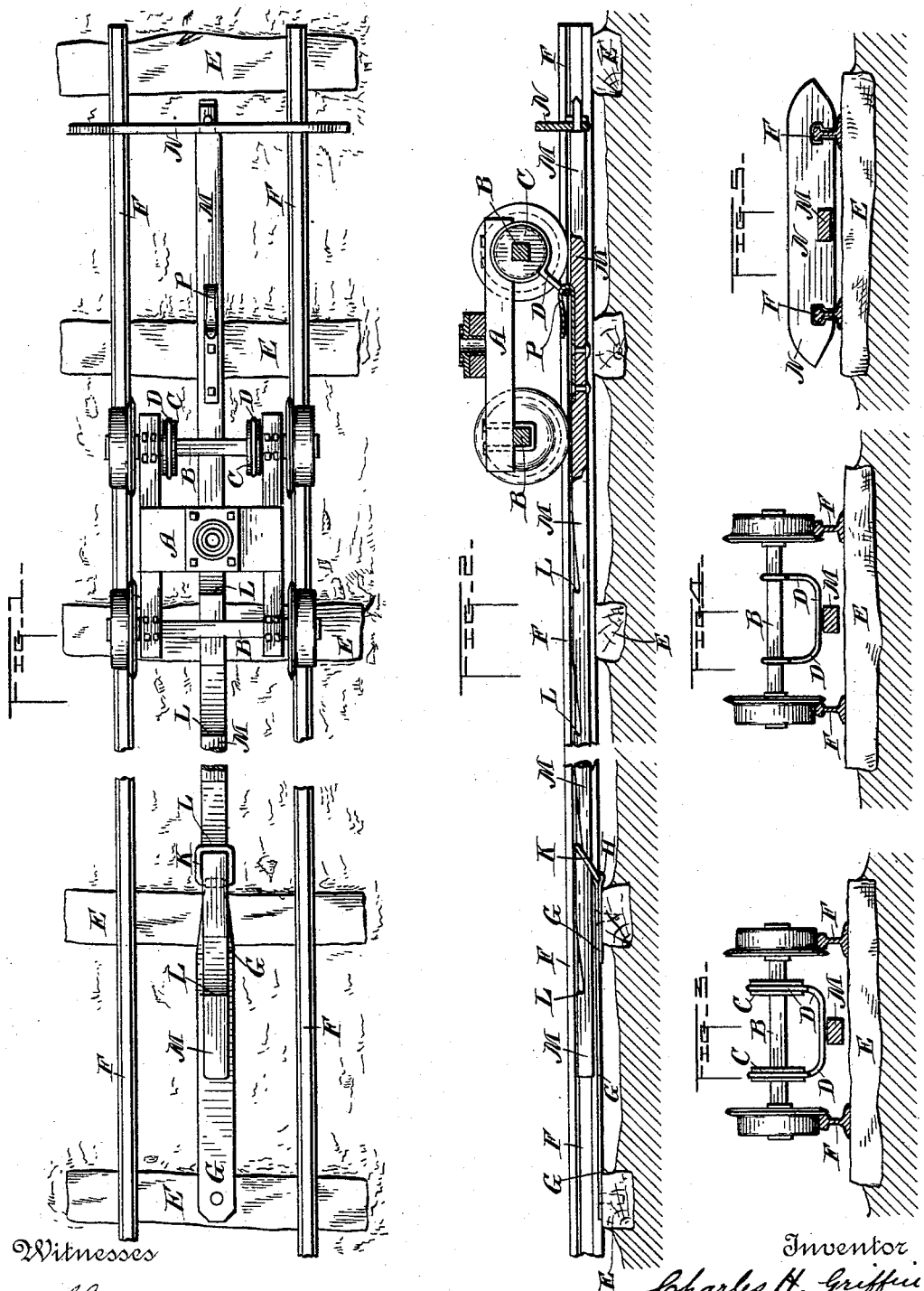

CHARLES H. GRIFFIN, OF LAKE CITY, COLORADO.

CAR-TRUCK AND MEANS FOR AUTOMATICALLY ARRESTING THE SAME.

SPECIFICATION forming part of Letters Patent No. 489,473, dated January 10, 1893.

Application filed May 23, 1892. Serial No. 434,025. (No model.)

*To all whom it may concern:*

Be it known that I, CHARLES H. GRIFFIN, of Lake City, in the county of Hinsdale and State of Colorado, have invented certain new and useful Improvements in Car-Trucks and Means for Automatically Arresting the Same; and I do hereby declare the following to be a full, clear, and exact description of the invention, such as will enable others skilled in the art to which it appertains to make and use the same.

My invention relates to dumping-cars such as are in general use in mining, and the object of my invention is to provide an arrangement by which the car can be automatically arrested when it arrives at the place where it is desired to dump the car load; and my invention consists more particularly in the construction, combination and arrangement of parts as hereinafter described and set forth in the claims.

Referring to the drawings in which: Figure 1 is a plan view of my arrangement; Fig. 2 is a side elevation of the same partly in cross-section; Figs. 3 and 4 are detail views showing alternative methods of attaching the catch to the axle of the car; and Fig. 5 is a detail view of the sliding guide-plate.

A represents the truck-frame of an ordinary dumping-car, supported upon the axles B, upon one of which axles are secured the collars C, upon which swings the clevis-shaped catch D. Bolted or otherwise firmly secured to the sleepers E, midway between the rails F, is a metallic strip or stay-piece G, which is bent round at one end to form an eye or bearing H for the link K. This link is adapted to engage one of the teeth L of the ratcheted strip M, which is also laid on the sleepers midway between the rails, and is retained in this position by the sliding guide-plate N, which is recessed at its ends to conform to the cross-section of the rails, so as to be capable of sliding in either direction on said rails.

Near the end of the strip M is bolted thereto the hook P. The strip M may be moved along the track within certain limits, as may be desired to dump the load, and is retained in such position by the engagement of the link K with the adjacent tooth of said ratchet.

The catch D is constructed so as to easily slip over any obstruction that may be met with in the upper part of the track, and at the same time to be caught by the hook P when it arrives thereat.

In Fig. 3 I have shown an arrangement by which the clevis or catch is fitted to the axle of any car; when such axle is specially constructed to receive this clevis, the shape of the clevis will be as shown in Fig. 4. I have in the drawings shown the catch as affixed to the forward axle, but it may instead be placed on the rear axle, if this be found preferable.

I do not limit my construction to any special form of car, as it may be applied to all cars, although it is more especially intended for mining cars, which are very liable to go over the dump and down the hill, especially when being used at night, and I believe that my device will entirely obviate all risks of this kind.

I claim:—

1. The combination of a car truck provided with a swinging catch suspended from the axle of said truck, with a catch secured to an adjustable bar situated between the rails of the track and adapted to engage said swinging catch and hold the car truck, substantially as and for the purpose set forth.

2. In means for automatically arresting a moving car-truck, the combination of a catch adapted to hold said car-truck, an extension or strip to which said catch is secured, a guide-plate secured to one end of said strip transversely thereto, and adapted to engage with and slide along the rails of the track, and means for longitudinally adjustably securing said strip between the rails of the track, substantially as described.

3. In means for automatically arresting a moving car-truck, the combination of a catch adapted to hold said car-truck, a ratcheted extension or strip to which said catch is secured, a guide-plate secured to one end of said strip transversely thereto, and adapted to engage with and slide along the rails of the track, a stay-piece secured to the sleepers and provided with a link adapted to engage a tooth of the ratcheted strip and hold the same in position, substantially as described.

In testimony whereof I have signed this specification in the presence of two subscribing witnesses.

CHARLES H. GRIFFIN.

Witnesses:
 LEE COWN,
 ALBERT FORREST.